United States Patent [19]
Khalil

[11] Patent Number: 5,128,937
[45] Date of Patent: Jul. 7, 1992

[54] ADAPTIVE BANDWIDTH BALANCING FOR DISTRIBUTED QUEUE DUAL BUS NETWORKS

[75] Inventor: Khalid M. Khalil, Piscataway, N.J.

[73] Assignee: Bell Communications Research, Inc., Livingston, N.J.

[21] Appl. No.: 686,707

[22] Filed: Apr. 17, 1991

[51] Int. Cl.⁵ .................... H04J 3/08; H04J 3/14; H04L 12/40
[52] U.S. Cl. .................... 370/85.6; 370/85.9; 370/118; 340/825.5
[58] Field of Search .............. 370/85.6, 94.1, 79, 370/80, 85.1, 85.9, 85.11, 118; 340/825.5, 825.51

[56] References Cited

U.S. PATENT DOCUMENTS

| | | | |
|---|---|---|---|
| 4,922,244 | 5/1990 | Hullett et al. | 370/94.1 |
| 4,926,418 | 5/1990 | Cidon et al. | 370/85.5 |
| 4,977,557 | 12/1990 | Phung et al. | 370/85.1 |
| 5,001,707 | 3/1991 | Kositpaiboon et al. | 370/85.1 |
| 5,038,346 | 8/1991 | Courtois | 370/85.6 |
| 5,038,347 | 8/1991 | Courtois | 370/85.6 |

OTHER PUBLICATIONS

J. Filipiak, "Access Protection for Fairness in a Distributed Queue Dual Bus Metropolitan Area Network", Proceedings of the IEEE, pp. 635-639, Sep. 1989.

M. Conti et al., "DQDB Media Access Control Protocol: Performance Evaluation and Unfairness Analysis", 3rd IEEE Workshop on Metropolitan Area Networks, San Diego, Mar. 28-30, 1989.

IEEE Standard 802.6, "Distributed Queue Dual Bus—Metropolitan Area Network", Proposed Standard, Version D.15, Oct. 1990, Forward and pp. 1-54.

K. Khalil and M. Koblentz, "A Fairness Distributed Queue Dual Bus Access Method", 14th IEEE Conference on Local Computer Networks, Minneapolis, Oct. 10-12, 1989.

E. Hahne et al "Improving the Fairness of Distributed-Queue Dual-Bus Networks", Proceedings of INEOCOM '90, San Francisco, Jun. 1990.

Primary Examiner—Douglas W. Olms
Assistant Examiner—Min Jung
Attorney, Agent, or Firm—Leonard Charles Suchyta; James W. Falk

[57] ABSTRACT

A distributed queue dual bus data packet network includes an adaptive bandwidth balancing mechanism in which a station priority, equal to the highest priority of waiting data at that station, and a network priority, equal to the highest priority of data received at a station, are defined. A bandwidth balancing system utilizing a balancing modulus to skip every (n+1)st time slot is enabled and disabled in response to the relative values of the station priority, network priority, request priority and data priority so as to maximize the efficiency of the balancing system. Activity timers are used for determining the if a station is the only active station on the network, and an end bit accompanies the request for transmission of the last segment of multi-segment transmissions, to further optimize the balancing enablement and disablement.

2 Claims, 4 Drawing Sheets

ADAPTIVE BANDWIDTH BALANCING FOR DISTRIBUTED QUEUE DUAL BUS NETWORKS

TECHNICAL FIELD

This invention relates to digital transmission systems and, more particularly, to improved bandwidth balancing in distributed queue dual bus (DQDB) networks.

BACKGROUND OF THE INVENTION

Distributed Queue Dual Bus (DQDB) digital networks have been proposed for interconnecting host computers, local area networks, servers and workstations. Each such DQDB network consists of a plurality of stations interconnected by two unidirectional busses, one for each direction of transmission. Fixed length time slots are generated on each bus which can be used by the stations to transmit a fixed length data segment downstream on the appropriate one of the two busses to the downstream destination station on that buss. Each slot includes a slot access header which, in turn, includes a busy bit indicating whether the slot is occupied or empty. Also included in the slot header are request bits by means of which stations indicate their wish to transmit a data segment on one of the dual busses. Each station then monitors the busy bits and the request bits on both busses, incrementing a counter for each received request bit and decrementing a counter for each received empty slot. A separate request counter is required for each bus to control the introduction of data segments into the time slots on the two busses.

If a station wishes to transfer a segment on bus A, the current count in the bus A request counter is transferred to a bus A countdown counter (resetting the request counter) and a request for a time slot is inserted in the first available slot on bus B. The countdown counter is decremented for each empty slot passing the station on bus A. When the countdown counter reaches zero, the station seizes the next empty time slot on bus A for transmission of the waiting data segment. Similar operations take place for transmission on bus B, using a bus B request counter and a bus B countdown counter. All stations on the DQDB network are simultaneously carrying on this counting process for each direction of transmission, thereby justifying the name "distributed queue dual bus" system. The distributed queue dual bus network is defined in the proposed IEEE Standard 802.6, Version D.0, June 1988.

It has been found that DQDB networks such as that described above, under heavy load, distribute the traffic among the various nodes or stations in a highly asymmetrical manner. The station which has first started transmission obtains the biggest share of the available bandwidth. Moreover, the service provided to a station depends upon the propagation delay between that station and the currently active station. In order to overcome these disadvantages, a bandwidth balancing mechanism has been proposed by E. Hahne, A Choundhury and N. Maxemchuk in "Improving the Fairness of Distributed-Queue Dual-Bus Networks," *Proceedings of INFOCOM '90*, San Francisco, June 1990. A balancing counter is maintained in each station for each bus to count the number of transmitted segments. A station is allowed to transmit only a fraction of the time during which its countdown counter is zero and an empty time slot is received. This fraction, called the bandwidth balancing modulus, can be set at some appropriate value such as eight. That is, the active station allows every ninth time slot to pass unused, thus allowing downstream stations to utilize that time slot. This mechanism increases the rate at which the downstream station can send out requests, hence increasing the bandwidth available to such downstream stations.

There are two main problems with this proposed bandwidth balancing mechanism. If the balancing modulus is maintained constant all of the time, the overhead for balancing is excessive for asymmetrical (e.g., single station) traffic. On the other hand, if the balancing modulus is varied from a central location, its response to bursty traffic will be extremely slow. More importantly, however, the bandwidth balancing mechanism described in the Hahne et al. article is not able to support the multi-level priorities specified as part of the IEEE 802.6 standard. Most systems include traffic with different priority needs, such as data bursts and real time traffic.

SUMMARY OF THE INVENTION

In accordance with the illustrative embodiment of the present invention, a multi-priority adaptive bandwidth balancing mechanism is enabled by each station for that station in response to the network traffic. Thus, when a single station is active on the network, as indicated by the lack of requests arriving from one direction and empty time slots arriving from the other direction, the bandwidth balancing mechanism is disabled. When more than one station is active, each station defines a station priority, equal to the highest priority of waiting traffic at that station, and a network priority, equal to the highest priority of the requests received by that station. When an active station receives a request, it may take one of three actions, depending on the relative station and network priorities. If the priority of the incoming request is higher than the current network priority, the network priority is raised to the priority of the incoming request and the station ceases transmission until the network priority is reduced to its station priority. If the priority of the received request is equal to the station's priority, then the station enables the bandwidth balancing mechanism to permit shared transmission, and continues transmitting. If the priority of the received request is lower than the station's own priority, then the station takes no action. In all cases, received requests are processed (i.e., counted).

When the only active station receives its first busy time slot, it assumes that the upstream transmitting station has the same priority as the station's own priority. In fact, the upstream station knows the relative priorities between it and the downstream station (from the downstream requests) and hence will use all of the time slots if it has a higher priority than the network priority and none of the time slots if it has a lower priority than the network priority.

In accordance with one feature of the present invention, an end bit can be used in the time slot header to identify the request for the transmission of the last data segment from a station. This bit allows the other stations to lower their network priorities immediately and begin to participate in the transmission bidding process.

In accordance with another feature of the present invention, a round trip delay counter can be used to time the loss of the end bit. The round trip delay counter is reset each time a request with the same priority as the network priority is received. If no new request with a priority equal to the network priority is received before the timeout of the round trip delay counter, the network priority is lowered to the station's own priority. Thus, the timeout of the delay counter has the same effect as the end bit and prevents the loss of optimization which would result if the end bit were lost. Less than optimal performance is possible without the use of the end bit, relying on the delay counter alone.

In accordance with yet another feature of the invention, each station assumes that it is the only active station on the network if an end bit is received (or if the delay counter times out). The station then assumes that it is the most downstream active station and begins using all empty time slots, but does not send out requests for the empty time slots which would have been passed up under the bandwidth balancing mechanism. If there is an active station downstream, that station will eventually send a request which will restart the adaptive bandwidth balancing mechanism. Meanwhile, no empty time slots will have been wasted in case there is no active downstream station.

In accordance with yet another feature of the present invention, each station assumes that it is the most upstream active station if it receives a number of contiguous empty time slots equal in number to the square root of twice the round trip delay (in time slots) between this time slot and the head of the bus. This value, developed by K. Khalil and M. Koblentz in "A Fairness Distributed Queue Dual Bus Access Method," 14th IEEE Conference on Local Computer Networks, Minneapolis, Oct. 10-12, 1989, allows the station to enable and disable the adaptive bandwidth balancing mechanism simply by noting the contiguous empty time slots on the bus.

The major advantage of the present invention is the behavior of the adaptive bandwidth balancing mechanism of the present invention under varying loads. Under light load (single station), the mechanism is disabled most of the time and little overhead is needed. Under heavy load, the adaptive mechanism of the present invention is at least as good as the prior art, nonadaptive balancing mechanisms. Just as importantly, the adaptive bandwidth balancing of the present invention is able to support multiple levels of priority, thus allowing the DQDB network to be used for mixed types of traffic.

BRIEF DESCRIPTION OF THE DRAWINGS

A complete understanding of the present invention may be gained by considering the following detailed description in conjunction with the accompanying drawings, in which.

To facilitate reader understanding, identical reference numerals are used to designate elements common to the figures.

DETAILED DESCRIPTION

Figure 1:
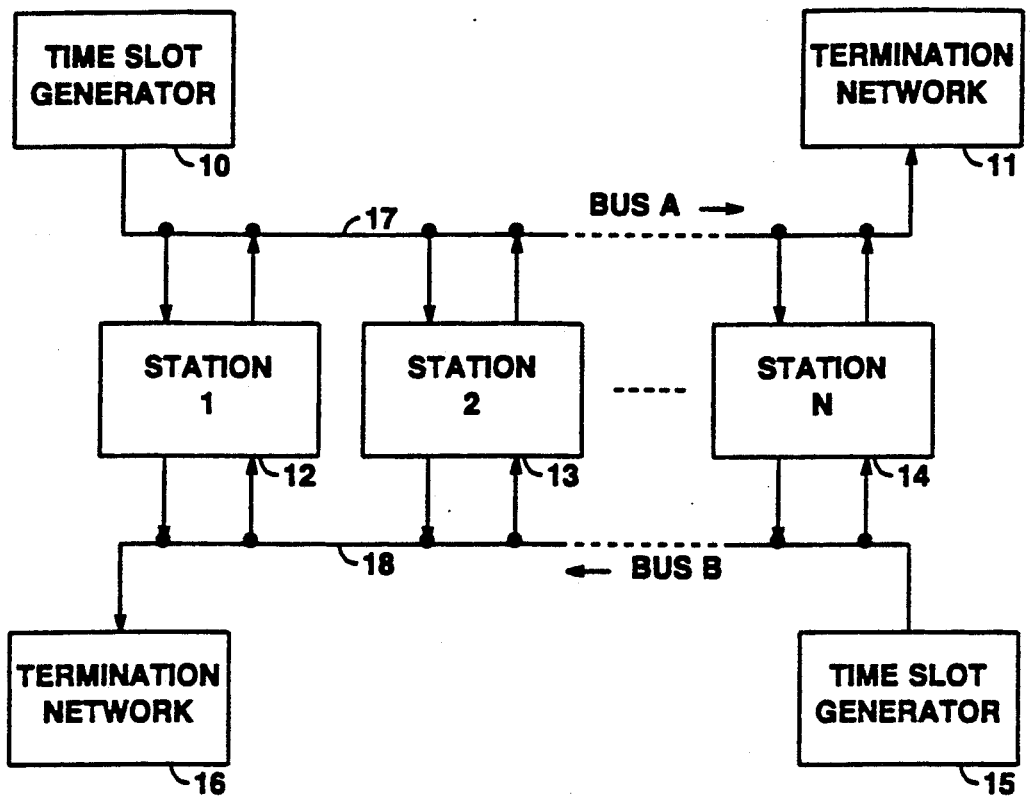
FIG. 1 shows a general block diagram of a distributed queue dual bus network in which the adaptive bandwidth balancing mechanism of the present may find use.

In FIG. 1 there is shown a general block diagram of a distributed queue dual bus (DQDB) network comprising a time slot generator 10 for establishing fixed length time slots for the transmission of data segments on left-to-right transmission bus 17 to a termination network 11. A similar time slot generator 15 establishes fixed length time slots for the transmission of data segments on right-to-left transmission bus 18 to a second termination network 16. A plurality of data generating and receiving stations 12, 13, ..., 14 are connected between busses 17 and 18 for the exchange of data traffic therebetween. Thus, inter-station traffic in the network of FIG. 1 travels on one or the other of busses 17 and 18, depending on which bus the receiving station is downstream from the transmitting station. The stations 12-14 may, for example, include computer hosts, printers, reproduction facilities or user workstations. Indeed, one of the stations 12-14 may comprise a gateway to another data transmission network.

The time slot generators 10 and 15 and the termination networks 11 and 16 may be co-located and the DQDB network arranged as a ring. Indeed, the time slot generation function and the network termination function can be accommodated at one of the stations 12-14. The dual busses operate asynchronously and simultaneously to form full duplex channels between any two stations on the network. The stations observe all of the traffic on both busses but do not remove it and only alter the contents of the passing data when permitted by the access circuits included in each station. Since access is controlled by information stored at each of the stations, the system is called a distributed queue system.

The network of FIG. 1 is asymmetrical in the sense that there are upstream and downstream stations on each of busses 17 and 18. Once an upstream station starts to transmit data, it has an advantage over downstream stations desiring to transmit data since all of the time slots can be seized by the upstream station. For this reason, it is necessary to provide some mechanism for ensuring a fair sharing of the available transmission bandwidth. Such mechanisms are called medium access control mechanisms.

*IEEE Distributed Queue Dual Bus Metropolian Area Network* standard 802.6 proposes that this service asymmetry be corrected by using a fraction of the transmission bandwidth to transmit information that can be used to permit coordination among the network stations. Such coordination is accomplished by exchanging information between the various stations by means of dedicated bits in the header of each time slot.

Figure 2:
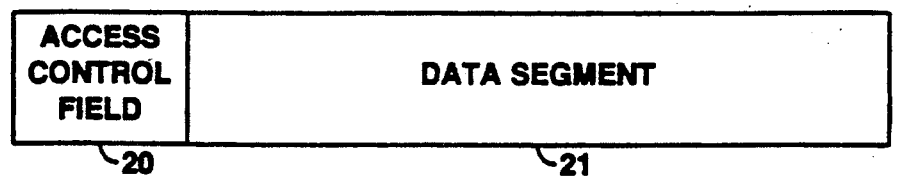
FIG. 2 shows a graphical representation of the format of a single time slot transmitted on the network of FIG. 1 and showing the use of a control field in the time slot header.

In FIG. 2 there is shown a graphical representation of a time slot format comprising an access control field 20 to control access to the busses by the various stations 12-14, and a data segment 21. The stations generate data in whatever format the users desire. The transmission mechanism, however, breaks the data stream into fixed sized data segments, and appends the access header 20 to the data segment. The access control field 20 includes the information which is used to control the use of the transmission channels 17, 18 among the various stations 12-14. Each time slot transmitted on either A bus 17 or B bus 18 has the format illustrated in FIG. 2. The size of the data segment 21 can be any desired length, but is typically on the order of 50 bytes (52 bytes in the IEEE 802.6 standard).

Figure 3:
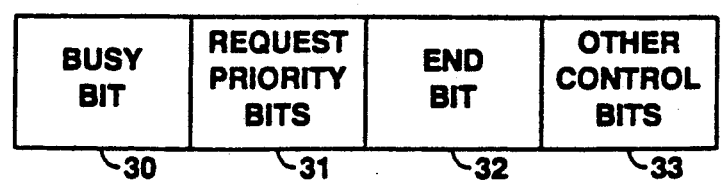
FIG. 3 shows a graphical representation of the format of the control field in the time slot header illustrated in FIG. 2.

In FIG. 3 there is shown a graphical representation of the contents of the access control field 20 in FIG. 2. The control field of FIG. 3 comprises a busy bit 30, for indicating whether the time slot is occupied or empty, and a plurality of request priority bits 31, one bit for each available priority level in the system of FIG. 1. A "one" bit in any one of the priority slots represents a request for service for a data segment having the corresponding priority. Thus, if there are N different priority levels, there are a corresponding N bit positions in field 31, any or all of which can be set by stations desiring to transmit a data segment of the appropriate priorities. An end bit 32 may optionally be used, as will be described hereinafter, to mark the request for the last data segment of a transmission from a particular station. Finally, field 33 includes all of the other control bits which might be used to administer the bus access system.

Figure 4:
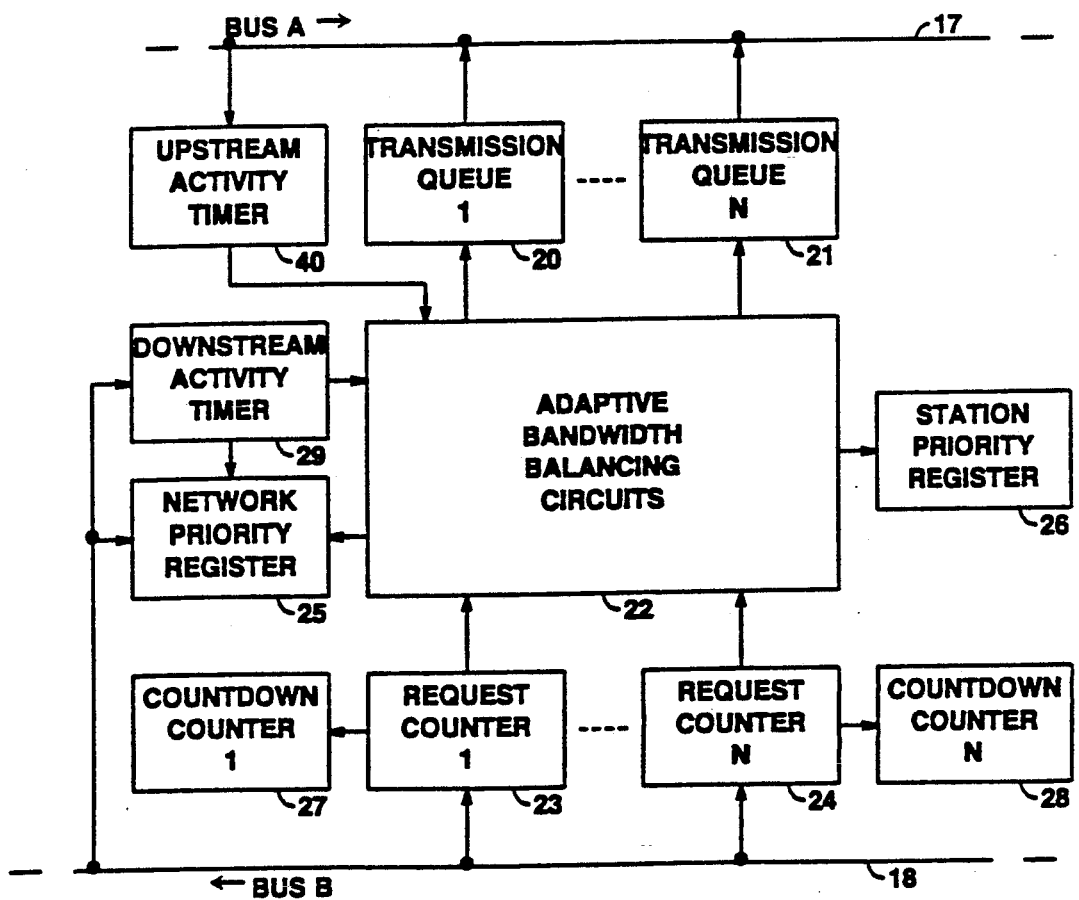
FIG. 4 shows a general block diagram of the control circuits for transmission on one bus in a single station of the system of FIG. 1, showing the adaptive bandwidth balancing circuit elements in accordance with the present invention.

In FIG. 4 there is shown a general block diagram of an adaptive bandwidth balancing station in accordance with the present invention which can be used as any one of the stations 12-14 of FIG. 1. Each station such as that shown in FIG. 4 is symmetrical in the sense that either bus 17 or bus 18 can be used to transmit data, one transmitting to the left and one transmitting to the right. For convenience, it will be assumed that the station of FIG. 4 transmits data segments to the right on bus 17 and receives requests from the right on bus 18. Only those portions of the station required for adaptive bandwidth balancing for data transmission to the right on bus 17 are shown in FIG. 4. All of the circuits hereafter described must be duplicated for transmission to the left on bus 18.

The station of FIG. 4 comprises a plurality of transmission queues 20 through 21 for queuing data segments to be transmitted on bus 17. Transmission queues 20-21 are FIFO (first in, first out) queues in the sense that the data segments are transmitted in the order of their arrival. One of transmission queues 20-21 is provided for each of the plurality of priorities 1 through N. Data segments with higher priorities are transmitted before data segments with lower priorities. Data segments from different stations but with equal priorities are transmitted at equal rates, using the adaptive bandwidth balancing technique of the present invention.

In order to implement the bandwidth balancing algorithm of the present invention, a plurality of request counters 23, . . . , 24 are connected to bus 18 to count requests from downstream stations (to the right) for transmission of data segments. Such requests are issued with a particular priority assignment corresponding to the priority of the data segment waiting to be transmitted at the downstream stations. Each of request counters 23-24 counts only the requests having the corresponding particular priority. These counts in counters 23-24 are monitored in adaptive bandwidth balancing circuits 22. If the station of FIG. 4 wishes to transmit a data segment from one of queues 20-21, a request is transmitted in the header of first available time slot arriving on B bus 18. Furthermore, the request count in the corresponding one of request counters 23-24 is transferred to a countdown counter corresponding to one of countdown counters 27, 28, and the request counter is reset to zero. The countdown counter counts down toward zero, decrementing its count one for each time slot passing the station on A bus 17. When the count in the countdown counter reaches zero, the station sends a data segment in the next empty time slot on bus 17.

In accordance with the present invention, a network priority and a station priority are defined for each station in the network of FIG. 1. A network priority register 25 stores the network priority, defined as the priority of the highest priority request received at the station of FIG. 4. A station priority register 26 stores the station priority, defined as the priority of the highest priority data segment stored in transmission queues 20-21. Furthermore, this station can assume that it is the most upstream active station if it receives a plurality k of consecutive empty time slots, where k is the transit delay, in time slots, from the head of the bus at time slot generator 10 (FIG. 1). An upstream activity timer 40 counts to k, given approximately by the square root of twice the round trip delay between this station and the time slot generator 10. If the station receives k consecutive empty time slots, it assumes that it is the most upstream station. On the other hand, the station can assume that it is the most downstream station if it receives no requests for time slots for l consecutive time slots, where l is the transit delay, in time slots, from the head of the bus at time slot generator 15 (FIG. 1). A downstream activity timer 29 therefore counts to l.

If the station is the only active station, i.e., it is the most upstream station and the most downstream station, it can disable the adaptive bandwidth balancing circuits and transmit data segments in each empty time slot. Small errors in the value of k or l merely disable the adaptive mechanism late, resulting in some extra time slots for the downstream stations, or disable the adaptive mechanism early, delaying its response to downstream station requests.

As will be described in detail hereinafter, the adaptive enablement of the bandwidth balancing mechanism is controlled by the relative priorities in registers 25 and 26 when a request is received on B bus 18, and by the count in activity timer 29. These mechanisms will be described in connection with the flow charts of FIGS. 5 through 9.

Figure 5:
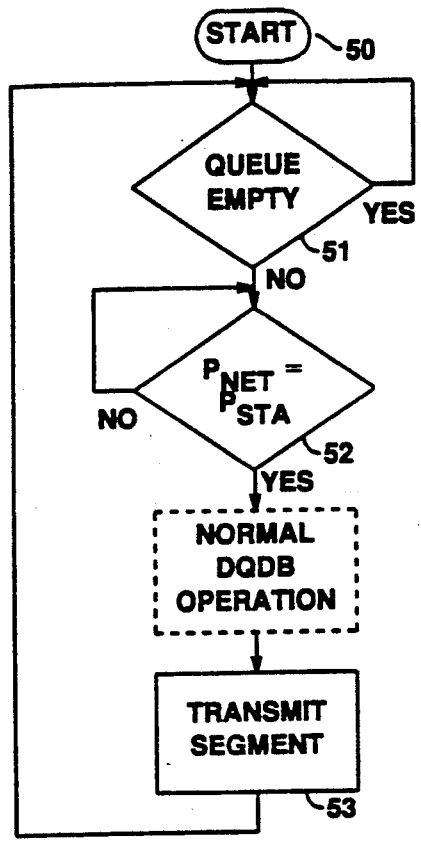
FIG. 5 shows a flow chart of the process of normal active station transmission of data segments using the adaptive bandwidth balancing mechanism of the present invention.

In FIG. 5 there is shown a flow chart of the normal data transmission function for the station of FIG. 4.

Starting at start box 50, decision box 51 is entered where it is determined whether or not this station has data segments available for transmission in one of transmission queues 20-21 in the station. If all transmission queues are empty, box 51 is re-entered to continually check the transmission queues 20-21 for data segments to be transmitted. If one of the transmission queues is not empty, decision box 52 is entered where the station priority for that station (in register 26) is compared to the network priority (in register 25). As noted above, the station priority for any station is the priority of the highest priority data segment in one of its transmission queues. The network priority is the priority of the highest priority request received at that station. If the station priority at this station is not equal to the network priority, decision box 52 is re-entered until the station priority is equal to the network priority. If the station priority is equal to the network priority, normal operation of the system continues. If the adaptive bandwidth balancing mechanism is enabled, the transmitting station skips every (n+1)st time slot, where n is the bandwidth balancing modulus. Specifically, in box 53, a data segment is transmitted on upper bus 17. Decision box 51 is then re-entered, looking for data other data segments available for transmission.

Figure 6:
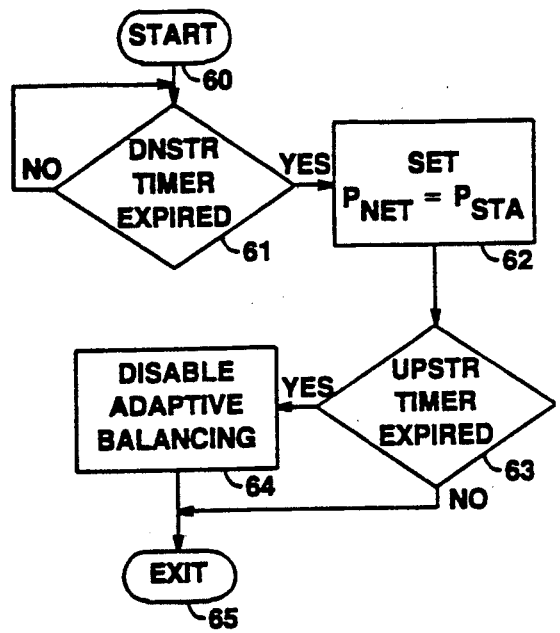
FIG. 6 shows a flowchart of the process which takes place in the station of FIG. 4 when the downstream delay timer expires (or and end bit is received) in order to carry out the adaptive bandwidth balancing mechanism of the present invention.

In FIG. 6 there is shown a detailed flow chart of the action which takes place when the downstream activity timer 29 of FIG. 4 times out. Starting in start box 60, decision box 61 is entered, determining whether or not the activity timer 29 has timed out. As discussed above, this timeout indicates that this station is the most downstream station. If so, box 62 is entered, setting the network priority value to the station priority value. If the downstream time has not expired, decision box 61 is re-entered, waiting for timeout of this timer.

If the network priority is reset in box 62, decision box 63 is entered to detect the expiration of upstream timer 40 (FIG. 4). If upstream timer 40 has expired, this station is the only station on the network and box 64 is entered to disable the adaptive balancing system. The process of FIG. 6 then exits at exit box 65. If the upstream timer 40 has not expired, the process is exited without disabling the adaptive balancing system.

Figure 7:
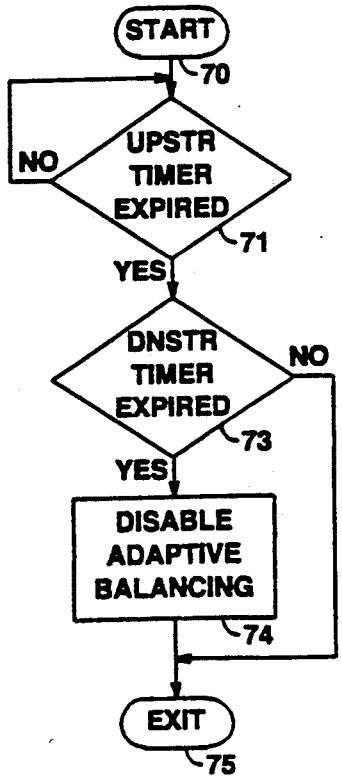
FIG. 7 shows a flowchart of the process which takes place in the station of FIG. 4 when the upstream delay timer expires in order to carry out the adaptive bandwidth balancing mechanism of the present invention.

A similar operation takes place for the upstream timer timeout in the flow chart of FIG. 7. In FIG. 7, starting at start box 70, decision box 71 is entered to determine if the upstream timer has expired. If not, box 71 is re-entered until the upstream timer does expire. Once, the upstream timer 40 does expire, decision box 73 is entered to determine if the downstream timer has also expired. If so, this station is the only active station on the network and, in box 74, the adaptive balancing circuits are disabled. If the downstream timer has not expired, the process terminates immediately in exit box 75. Note that the flow chart of FIG. 7 differs from the flow chart of FIG. 6 in that the network priority level is not changed when the upstream timer expires. Although this station is the most upstream station on the network, other downstream stations may have a higher priority.

Figure 8:
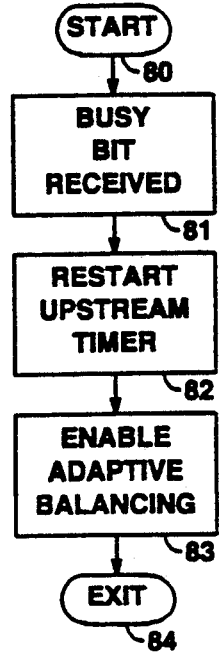
FIG. 8 shows a flowchart of the process which takes place in the station of FIG. 4 when a busy bit is received and the adaptive bandwidth balancing mechanism of the present invention is enabled in order to carry out the adaptive bandwidth balancing procedure of the present invention.

In FIG. 8 there is shown a detailed flow chart of the process which takes place when a time slot is received with the busy bit set, indicating an upstream active station. Starting in start box 80, box 81 is entered where the reception of a busy bit is detected. If a busy bit is detected, box 82 is entered to restart the upstream timer. Box 83 is then entered to enable the adaptive bandwidth balancing mechanism. Exit box 84 is then entered to terminate the process. Adaptive bandwidth balancing is therefore initiated, and the upstream timer restarted, any time a busy bit is received, indicating that at least one other station is active in the network.

Figure 9:
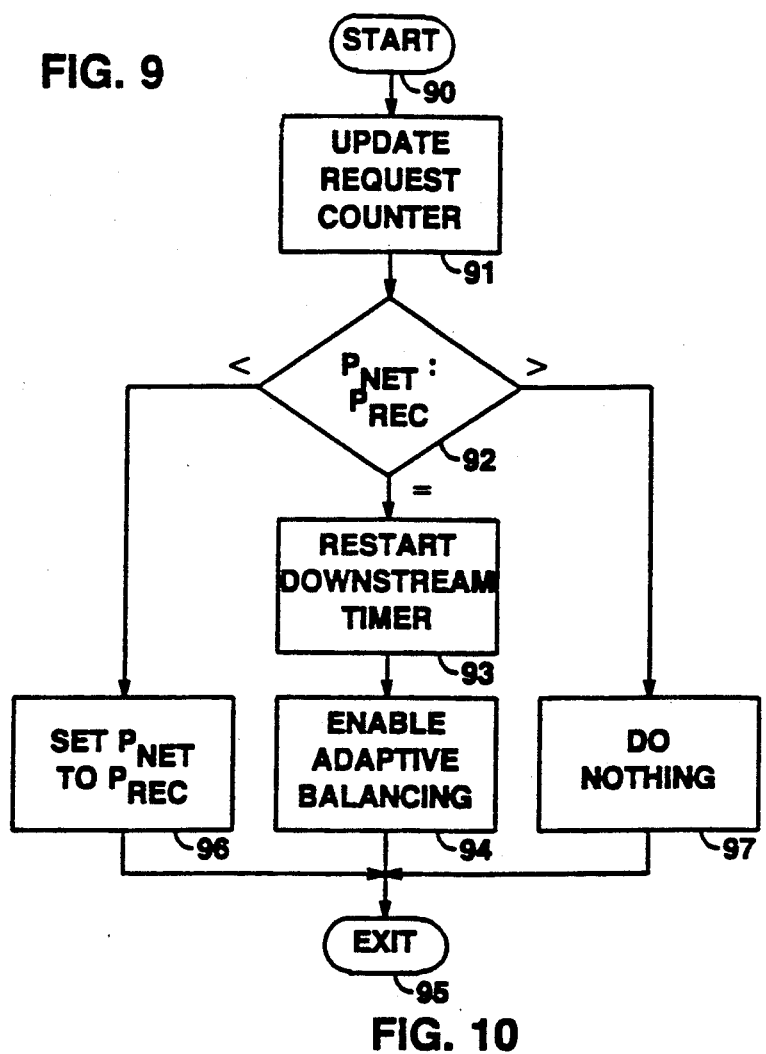
FIG. 9 shows a flowchart of the process which takes place in the station of FIG. 4 when a request is received, in order to carry out the adaptive bandwidth balancing procedure of the present invention.

In FIG. 9 there is shown a detailed flow chart of the process which takes place when a request is received at a station. These requests are received in request priority bits 31 in the access control field 20 in the header of a received time slot. Starting at start box 90 in FIG. 9, box 91 is entered where the request counter for the priority level of the received request is incremented. Thereafter, decision box 92 is entered, where the network priority, stored in register 25 of FIG. 4, is compared to the priority of the received request. If the network priority is greater than the received priority, box 97 is entered and nothing is done, and exit box 95 is entered. If the network priority stored in register 25 is less than the received priority, box 96 is entered where the network priority is set to the priority of the received busy bit, and exit box 95 is entered, thus maintaining the network priority at the priority of the highest priority request transmitted in the network. If the network priority is equal to the received priority, box 93 is entered where the downstream timer is restarted, looking for 1 consecutive time slots with no requests in their header. Thereafter, box 94 is entered where the adaptive bandwidth balancing mechanism is enabled, and then exit box 83 is entered.

Figure 10:
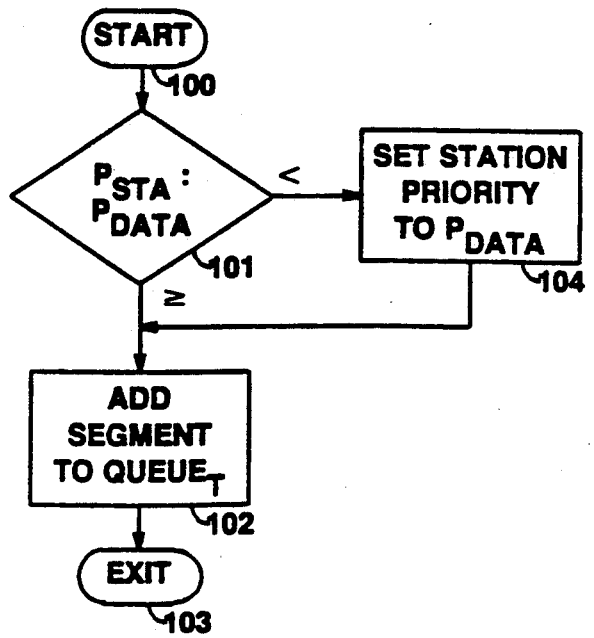
FIG. 10 shows a flowchart of the process which takes place in the station of FIG. 4 when a data segment is received, in order to carry out the adaptive bandwidth balancing procedure of the present invention.

In FIG. 10 there is shown a detailed flow chart of the process which takes place when a data segment is received at the station for transmission. Starting at start box 100, decision box 101 is entered where the station priority, stored in register 26 in FIG. 4, is compared to the priority level $P_{STA}$ of the data segment received. If the station priority is equal to or greater than the priority of the data segment received, box 102 is entered to add the data segment to the appropriate one of queues 20-21 (along with an appropriate header) and thus make it available for transmission. The process then terminates in exit box 103. If the station priority is less than the priority of the data segment received, box 104 is entered where the station priority is set to the priority of the data segment received. Box 102 is again entered to add the data segment (with header) to the appropriate one of queues 20-21, and the process exited at exit box 103. It thus is clear that the station priority is continually maintained at the priority of the highest priority data segment waiting to be transmitted.

In combination, the processes of FIGS. 5 through 10 cooperate to carry out the adaptive bandwidth balancing of the present invention. If a station is the only active station on the network, or if the station is the highest priority station on the network, that station continues to transmit continually and no bandwidth sharing takes place. If a station has a station priority lower than the priority of at least one other station on the network, that station ceases to transmit data. Finally, if more than one station have a station priority equal to the network priority, those stations share in the use of the available bandwidth using the algorithm which includes skipping every (n+1)st time slot to allow sharing of the available bandwidth. Switching between these three modes of operation is controlled as shown in FIGS. 5-10. In FIG. 5, for example, a station is controlled so as to transmit a data segment only if the station priority is equal to the network priority. (If the station priority is greater than the network priority, the network priority is raised to the station priority value, thus allowing the station to transmit.) In FIGS. 6 and 7, the activity timers are used to disable the bandwidth balancing when this station becomes the only active station. If another upstream station is active, a received busy bit will soon reset this station to the adaptive bandwidth balancing mode, as shown in FIG. 8. In FIG. 9, the priority of a received request is used to raise the network priority to the priority of the received request, if the received request priority is higher, and thus maintain the network priority at the priority of the highest data segments in the network. Furthermore, if the network and received priority are the same, adaptive bandwidth balancing is enabled to insure fair sharing of the transmission bandwidth. The process of FIG. 10 insures that the station priority is always equal to the priority of the highest priority data segment waiting to be transmitted.

It can be seen that the arrangements of the present invention maximize the throughput of distributed queue dual bus networks by enabling and disabling a bandwidth balancing network depending on whether a station is the only transmitting station on the network. Moreover, it is assumed that the station is the only station on the network when it first starts transmitting. Activity timers are used to determine if a station is the only active station of the network and thus permit the disablement of the bandwidth balancing network. An end bit accompanying the request for the last data segment of a data transmission can be used to lower the network priority and to disable the bandwidth sharing just as soon as this last request is received. The details of the bandwidth balancing circuits 22 of FIG. 4 are well known in the prior art and form no part of the present invention and hence will not be disclosed in further detail here. IEEE Standard 806.2 can be consulted for these details.

It should also be clear to those skilled in the art that further embodiments of the present invention may be made by those skilled in the art without departing from the teachings of the present invention.

What is claimed is:

1. A dual bus distributed queue network comprising
   a pair of oppositely transmitting channels,
   a plurality of stations connected to both of said channels for transmission of data segments in recurring time slots thereon,
   a bandwidth balancing arrangement in each station for enforcing the sharing of the transmission bandwidth between that station and other stations of said plurality, and
   means at each station for selectively enabling and disabling said bandwidth balancing arrangement at said each station, said means including means for detecting the lack of requests arriving at said each station from one of said transmission channels and for detecting the arrival of empty time slots from the other of said transmission channels.

2. A dual bus distributed queue network in accordance with claim 1 wherein each of said stations further comprises
   a plurality of transmission queues,
   a network priority register for storing the priority of the highest priority request received at said station, and
   a station priority register for storing the priority of the highest priority data segment stored in any of said plurality of transmission queues in said station, and
   wherein said selective enabling and disabling means comprises a down stream activity timer and an upstream activity counter.

* * * * *